US008056250B2

(12) United States Patent
Yanata (10) Patent No.: US 8,056,250 B2
(45) Date of Patent: Nov. 15, 2011

(54) ROTARY DISK ECCENTRICITY MEASUREMENT METHOD, ROTARY ENCODER, AND ROTARY MEMBER CONTROL DEVICE

(75) Inventor: Toshio Yanata, Ebina (JP)

(73) Assignee: Ricoh Company, Ltd., Tokyo (JP)

( * ) Notice: Subject to any disclaimer, the term of this patent is extended or adjusted under 35 U.S.C. 154(b) by 269 days.

(21) Appl. No.: 12/551,004

(22) Filed: Aug. 31, 2009

(65) Prior Publication Data
US 2010/0061003 A1 Mar. 11, 2010

(30) Foreign Application Priority Data

Sep. 8, 2008 (JP) .................................. 2008-230110
Nov. 26, 2008 (JP) .................................. 2008-300677

(51) Int. Cl.
*G01B 11/26* (2006.01)
(52) U.S. Cl. .......................................... 33/550; 33/1 PT
(58) Field of Classification Search .................. 33/1 PT, 33/706, 707, 550
See application file for complete search history.

(56) References Cited

U.S. PATENT DOCUMENTS

| 5,359,784 | A * | 11/1994 | Tomida et al. | 33/550 |
| 6,170,162 | B1 * | 1/2001 | Jacobsen et al. | 33/1 PT |
| 6,388,826 | B2 * | 5/2002 | Iikawa et al. | 33/645 |
| 7,078,677 | B2 * | 7/2006 | Chong et al. | 33/1 PT |
| 7,199,355 | B2 * | 4/2007 | Lippuner | 33/1 PT |
| 2006/0196065 | A1 * | 9/2006 | Bankestrom et al. | 33/550 |
| 2008/0010844 | A1 * | 1/2008 | Lindberg | 33/520 |
| 2008/0047151 | A1 * | 2/2008 | Davidson | 33/1 PT |

FOREIGN PATENT DOCUMENTS

| JP | 1-276019 | 11/1989 |
| JP | 7-234103 | 9/1995 |
| JP | 2715562 | 11/1997 |
| JP | 10-281811 | 10/1998 |
| JP | 2001-227990 | 8/2001 |
| JP | 2001-264119 | 9/2001 |
| JP | 2007-64949 | 3/2007 |
| JP | 2007-183255 | 7/2007 |
| JP | 2008-145299 | 6/2008 |

* cited by examiner

*Primary Examiner* — G. Bradley Bennett
(74) *Attorney, Agent, or Firm* — Cooper & Dunham LLP

(57) ABSTRACT

An eccentricity measurement method of measuring the eccentricity between a center of a connection portion of a rotary disk of a rotary encoder connected to a rotary shaft of a rotary member, and a center of a scale provided at the periphery of the rotary disk. The method includes forming, on the rotary disk, a circle pattern concentric with the scale and at least three straight-line patterns intersecting or contacting the circle pattern and the connection portion; and measuring an amount and direction of the eccentricity of the rotary disk by comparing a coordinate of the center of the connection portion, calculated from coordinates of intersections of the straight-line patterns and the connection portion, with a coordinate of the center of the scale, calculated from the coordinates of intersections of the straight-line patterns and the circle pattern.

11 Claims, 10 Drawing Sheets

ROTARY DISK ECCENTRICITY MEASUREMENT METHOD, ROTARY ENCODER, AND ROTARY MEMBER CONTROL DEVICE

CROSS-REFERENCE TO RELATED APPLICATIONS

This patent application is based on and claims priority pursuant to 35 U.S.C. §119 from Japanese Patent Application Nos. 2008-230110, filed on Sep. 8, 2008, and 2008-300677, filed on Nov. 26, 2008, both in the Japan Patent Office, which are hereby incorporated herein by reference in their entirety.

BACKGROUND OF THE INVENTION

1. Field of the Invention

Exemplary aspects of the present invention generally relate to a rotary encoder, particularly to a device which measures the difference between the rotational center of a rotary disk and the center of a radial scale provided on the rotary disk to detect the rotational state of the rotary disk, i.e., the amount of rotational eccentricity.

2. Description of the Background Art

Devices that detect the rotational state of a rotary member, such as the rotation speed and the rotation amount (i.e., angle of rotation) thereof, include a photoelectric rotary encoder. In a photoelectric rotary encoder, the periphery of a rotary disk connected to a rotary shaft of the rotary member is provided with a radial scale including alternating light-transmitting portions and light-blocking portions, or light-reflecting portions and light-absorbing portions.

A light projector projects a light flux onto the radial scale, and light reflected by or transmitted through the radial scale is detected by a detection device. Then, using signals from the detection device, the rotational state of the rotary disk is detected.

In general, the detection accuracy of the above-described rotary encoder is significantly reduced if the center of rotation of the rotary disk and the center of the radial scale are not aligned, that is, if there is an eccentricity between the two centers.

Of course, the reduction in detection accuracy can be prevented by aligning the center of rotation of the rotary disk and the center of the radial scale, and to accomplish that the accuracy of manufacturing and assembly of the radial scale and the center of rotation of the rotary disk may be enhanced, as in certain known techniques. Alternatively, the radial scale may be attached to the rotary shaft while the center of the radial scale and the center of rotation of the rotary shaft are adjusted with the use of a microscope or the like, as in other background techniques.

If the manufacturing and assembly accuracy is increased, adjustment is unnecessary in the assembly or replacement of components, and thus the assembly work is simplified. However, to achieve such relatively high accuracy the cost is increased. Further, such relatively high accuracy is required not only of the manufacturing and assembly means, such as the methods and the tools employed, but also in a post-production testing and measurement.

Meanwhile, if the rotary disk is assembled after being properly aligned, the cost of manufacturing and assembling the rotary disk is not so high. However, it is difficult to assemble and adjust the rotary disk, and thus it takes a relatively long time for the assembly and adjustment.

Figure 1:
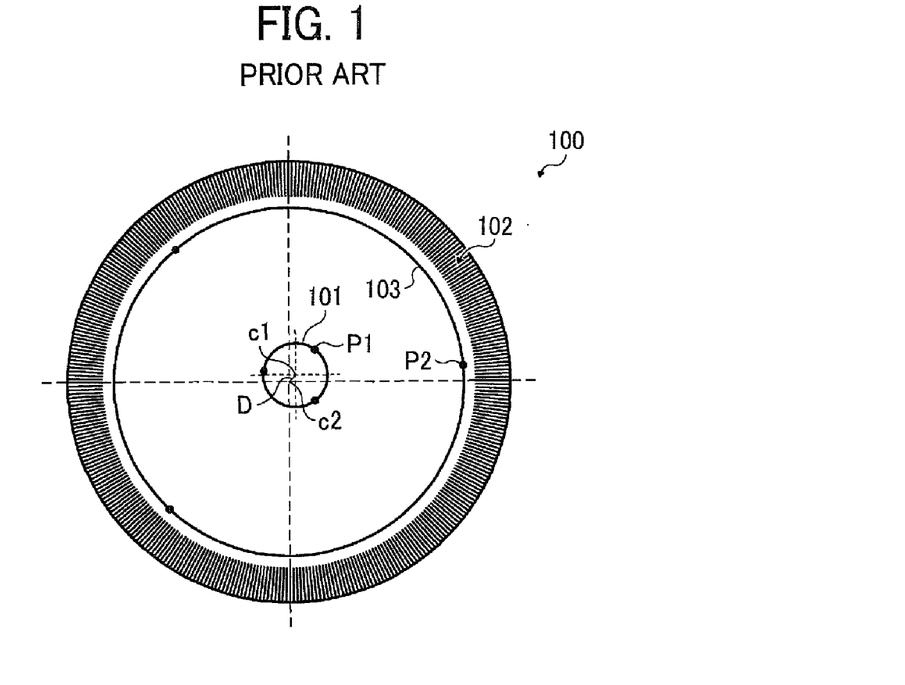
FIG. 1 is a diagram illustrating an example of the measurement of eccentricity of a rotary disk according to a background technique.

FIG. 1 is a diagram illustrating an example of the post-production measurement of eccentricity of a rotary disk according to a background technique.

A rotary disk 100 illustrated in FIG. 1 includes a mounting portion 101 and a radial scale 102. The mounting portion 101, which is a hole near the center in FIG. 1, is used to attach the rotary disk 100 to a detected abject (i.e., rotary member) such as a roller.

To calculate the center of rotation c1 of the rotary disk 100, the coordinates of an arbitrary point p1 on the circumference of the mounting portion 101 are first measured at at least three locations (three locations in the drawing) with the use of a measuring microscope or the like. On the basis of the measured coordinates, the coordinates of the center of rotation c1 of the rotary disk 100 can be calculated.

Then, to calculate the center c2 of the radial scale 102, the coordinates of an arbitrary point p2 on the circumference of a circle pattern 103 drawn concentrically with the radial scale 102 are measured at at least three locations (three locations in the drawing). On the basis of the measured coordinates, the coordinates of the center c2 of the radial scale 102 can be calculated.

The previously calculated coordinates of the center of rotation c1 of the rotary disk 100 are then compared with the coordinates of the center c2 of the radial scale 102 to obtain an eccentricity amount D.

Ultimately, whether or not the obtained eccentricity amount D meets a separately set standard is checked, and whether or not the rotary disk 100 can be used as a product for a rotary encoder is determined.

In the above-described eccentricity measurement method, however, in order to perform accurate measurement, it is necessary to accurately select the respective measurement points p1 and p2 without misalignment. In order to accurately select the measurement points, the expertise of a measurer and complicated image processing by a measuring device are necessary. As a result, the time for completing the measurement is increased.

Further, in the measurement of the measurement points, which uses a projector or microscope, a pattern enlarged by the device is blurred. Therefore, it is difficult to accurately select the measurement points, and thus to accurately measure the eccentricity amount.

SUMMARY OF THE INVENTION

In view of the foregoing, in one illustrative embodiment of the present invention, an eccentricity measurement method measures the eccentricity between a center of a connection portion of a rotary disk of a rotary encoder connected to a rotary shaft of a rotary member and a center of a scale formed at the peripheral portion of the rotary disk. The eccentricity measurement method includes forming, on the rotary disk, a circle pattern concentric with the scale and at least three straight-line patterns intersecting or contacting the circle pattern and the connection portion and measuring an amount and direction of eccentricity of the rotary disk by comparing a coordinate of the center of the connection portion, which is calculated from coordinates of intersections of the straight-line patterns and the connection portion, with a coordinate of the center of the scale, which is calculated from the coordinates of intersections of the straight-line patterns and the circle pattern. A central portion of the rotary disk includes the connection portion and the scale including one of a combination of a light-transmitting portion and a light-blocking portion, or a light-reflecting portion and a light-absorbing portion.

In another illustrative embodiment of the present invention, a rotary encoder includes a rotary disk, an eccentricity amount and direction of which are measured by the eccentricity measurement method; a light projection device to irradiate light onto the rotary disk; a light detection device to detect light transmitted through or reflected by a scale provided to the rotary disk; and a rotation detection device to detect the rotational state of the rotary disk in accordance with a result of the detection provided by the light detection device.

In yet another illustrative embodiment of the present invention, a rotary member control device controls the rotation of a rotary member. The rotary member control device includes the rotary encoder attached to the rotary shaft of the rotary member, to detect the rotational state of the rotary disk; a storage device to store the eccentricity amount and direction of the rotary disk; and an error correction device to correct the rotational state in accordance with the eccentricity amount and direction such that the corrected rotational state is used to control the rotation of the rotary member.

BRIEF DESCRIPTION OF THE DRAWINGS

A more complete appreciation of the invention and many of the advantages thereof are obtained as the same becomes better understood by reference to the following detailed description when considered in connection with the accompanying drawings, wherein.

DETAILED DESCRIPTION OF PREFERRED EMBODIMENTS

In describing illustrative embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Illustrative embodiments of the present invention are now described below with reference to the accompanying drawings.

In a later-described comparative example, illustrative embodiment, and alternative example, for the sake of simplicity of drawings and descriptions, the same reference numerals will be given to constituent elements such as parts and materials having the same functions, and redundant descriptions thereof omitted.

Typically, but not necessarily, paper is the medium from which is made a sheet on which an image is to be formed. It should be noted, however, that other printable media are available in sheet form, and accordingly their use here is included. Thus, solely for simplicity, although this Detailed Description section refers to paper, sheets thereof, paper feeder, etc., it should be understood that the sheets, etc., are not limited only to paper, but includes other printable media as well.

Referring now to the drawings, wherein like reference numerals designate identical or corresponding parts throughout the several views, particularly to FIGS. 2 to 9, a first embodiment of the present invention will be described in detail.

First Embodiment

Figure 2:
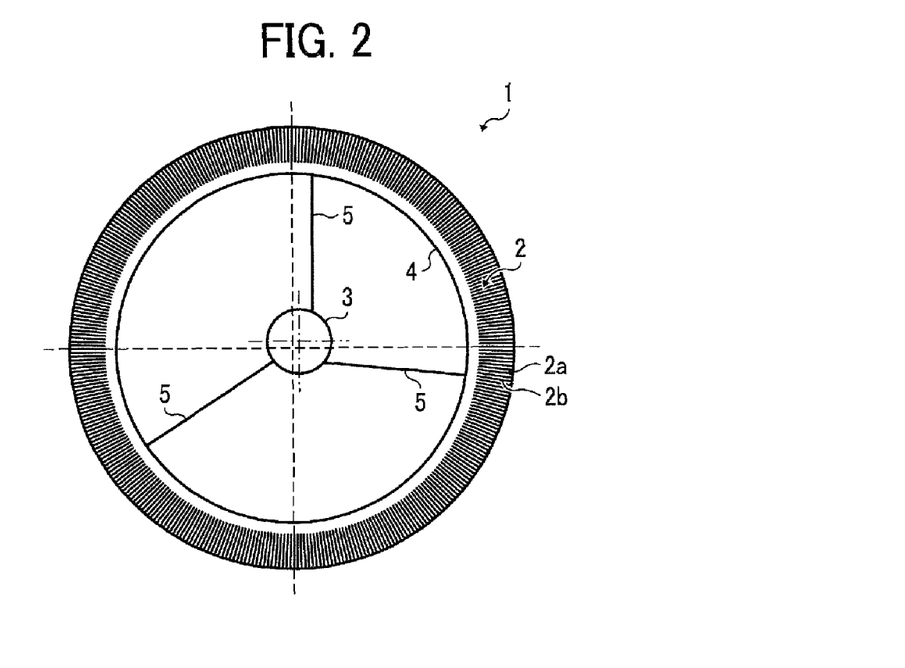
FIG. 2 is a diagram illustrating a rotary disk forming a rotary encoder according to an illustrative embodiment of the present invention.

FIG. 2 is a diagram illustrating a rotary disk forming a rotary encoder according to an illustrative embodiment of the present invention. In FIG. 2, a rotary disk 1 includes a radial scale 2, an attachment hole 3, a concentric circle pattern 4, and three straight-line patterns 5. The radial scale 2 includes light-transmitting portions 2a and light-blocking portions 2b. The attachment hole 3 is a connection portion connected to a rotary shaft of a measured object (i.e., rotary member). The concentric circle pattern 4 is concentric with the radial scale 2. Each of the three straight-line patterns 5 extends from the attachment hole 3 to a point on the concentric circle pattern 4.

The straight-line pattern 5 may be configured to be in exact contact with the concentric circle pattern 4, as illustrated in FIG. 2, or may be configured to intersect with (i.e., pierce through) the concentric circle pattern 4.

In FIG. 2, three straight-line patterns 5 are formed. However, the number of the straight-line patterns 5 is not limited thereto, as long as the number is at least three. Further, the radial scale 2, the concentric circle pattern 4, and the straight-line patterns 5 of the rotary disk 1 are simultaneously formed when a photo-etching plate for the rotary disk 1 is produced.

With the use of the plate, the attachment hole 3 (i.e., central hole) is formed in a sheet having the above-described patterns drawn thereon, and the shape of the rotary disk 1 is cut out of the sheet. In the process of opening the attachment hole 3, a bias (i.e., eccentricity) occurs between the concentric circle pattern 4 and the attachment hole 3.

The amount of the eccentricity is measured in a similar manner to the above-described background technique. That is, the coordinates of the center point of the attachment hole 3 are calculated on the basis of the coordinates of the measurement points on the attachment hole 3. Further, the coordinates of the center point of the concentric circle pattern 4 are calculated on the basis of the coordinates of the measurement points on the concentric circle pattern 4. Then, the coordinates of the center point of the attachment hole 3 are compared with the coordinates of the center point of the concentric circle pattern 4 to calculate the eccentricity amount.

In the present embodiment, the measurement points are set to be the intersections of the straight-line patterns 5 and the concentric circle pattern 4 and the intersections of the straight-line patterns 5 and the attachment hole 3. Further, the coordinates of the intersections are measured by a measuring microscope produced by Mitsutoyo Corporation (e.g., MF series) or a microscope produced by Keyence Corporation (e.g., VHX series).

Figure 3:
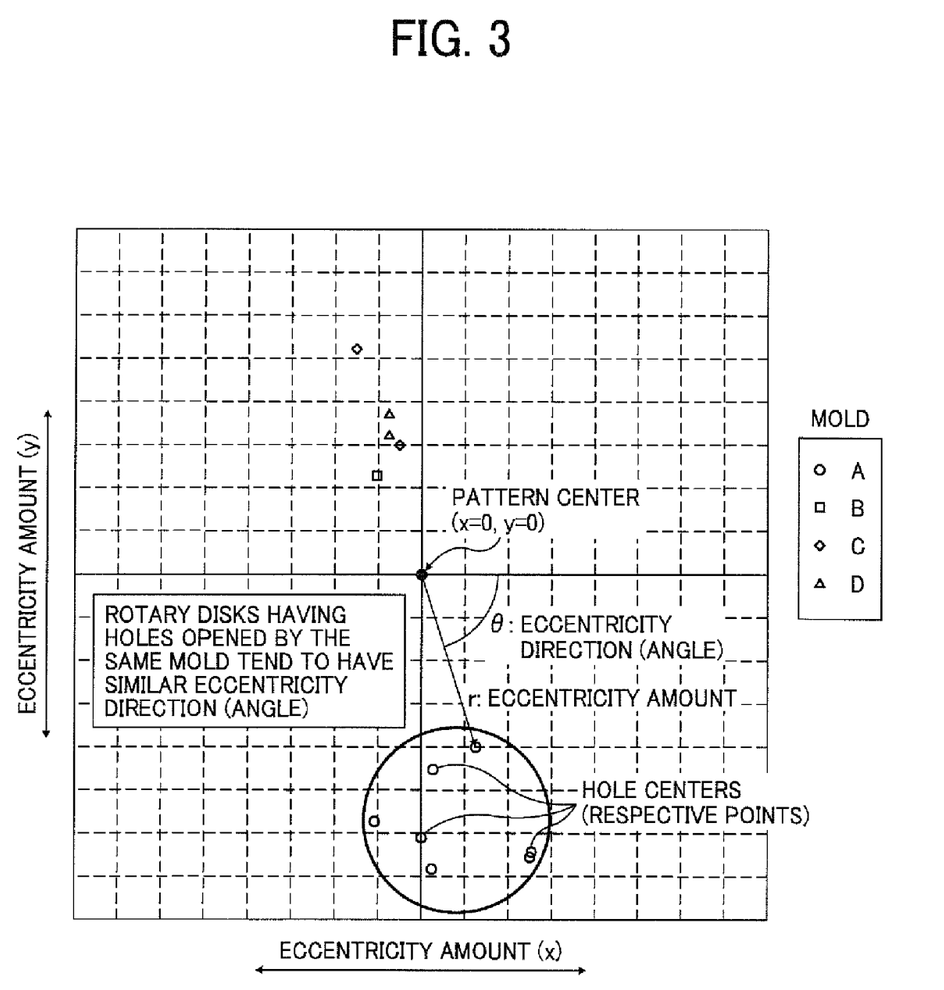
FIG. 3 is a graph illustrating the measured coordinates of respective center points of a plurality of rotary disks.

FIG. 3 is a graph illustrating the measured coordinates of respective center points of a plurality of rotary disks 1. FIG. 3 illustrates the coordinates of respective center points of the corresponding attachment holes 3, with reference to the coordinates of the center point of the concentric circle pattern 4.

On the basis of the graph, the eccentricity amount is calculated as the distance between the center point of the concentric circle pattern 4 and the center point of the attachment holes 3. Further, with the use of one of the straight-line patterns 5 as a reference, the angle of eccentricity can be accurately calculated.

Figure 4A:
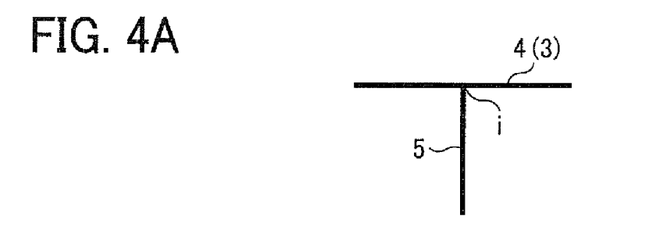
FIGS. 4A to 4C are partial schematic diagrams of a portion in the vicinity of the intersection of a concentric circle pattern and one of straight-line patterns in FIG. 2.
Figure 4B:
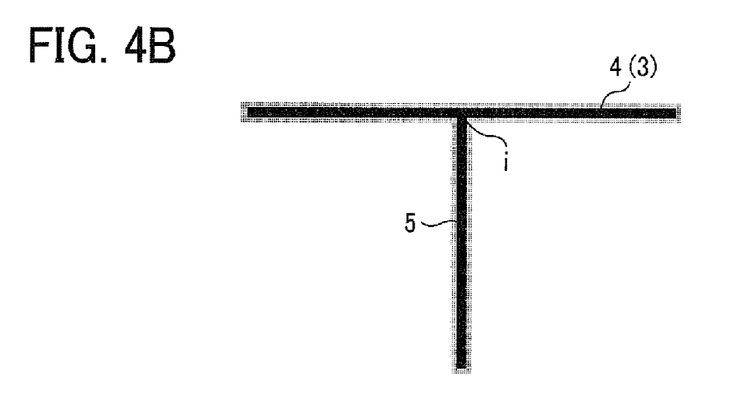
Figure 4C:
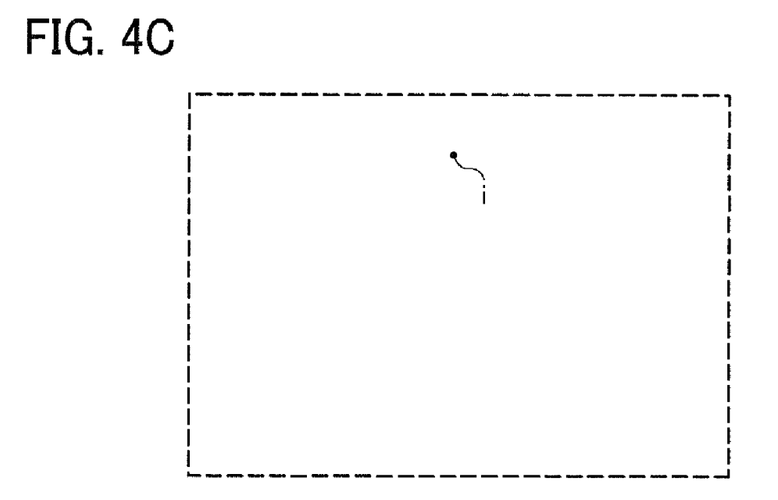

FIGS. 4A to 4C are partial schematic diagrams of a portion in the vicinity of the intersection i of one of the straight-line patterns 5 and the concentric circle pattern 4 or the attachment hole 3. FIG. 4A illustrates the patterns drawn on the rotary disk 1. FIG. 4B illustrates the patterns enlarged by a measuring microscope. FIG. 4C illustrates the patterns enlarged by the measuring microscope and subjected to gray scale processing.

As illustrated in FIG. 4B, the enlargement of the patterns by the microscope results in the blurring of edge portions of lines forming the patterns. For example, in cases such as when a rotary disk is held by a glass plate or the like to correct the warpage or distortion of the rotary disk, the edge portions of the lines tend to blur.

Even if the patterns are blurred, however, the portion of the intersection i, at which two lines intersect or contacting each other, remains as a portion of a relatively high density. Therefore, if the portion of a relatively high density is selected as a measurement point, the coordinates of the measurement point can be accurately measured. Further, the coordinates of the center point of the concentric circle pattern 4 or the attachment hole 3 can be accurately calculated.

Further, as illustrated in FIG. 4C, only the portion of the intersection i remains as an image after the display of FIG. 4B is subjected to image processing (i.e., gray scale processing). Therefore, further accurate measurement can be performed.

As described above, the circumference of the attachment hole 3 of the rotary disk 1 intersects with the straight-line patterns 5. Therefore, even if an enlarged edge portion of the circumference is blurred, the edge portion can be accurately identified on the basis of the shade of color of the straight-line patterns 5, unlike the background technique which selects the measurement point from a blurred line or edge portion and thus tends to increase the error, and which requires the measurement expertise.

Further, the concentric circle pattern 4 concentric with the radial scale 2 on the rotary disk 1 intersects with the straight-line patterns 5. Therefore, even if the lines of the enlarged patterns are blurred, the edge portions can be accurately identified on the basis of the shade of color of the pattern intersecting portions.

As described above, with the straight-line patterns 5, it is possible to accurately measure a measurement point and obtain the coordinates thereof. The present invention further intends to detect a measurement error occurring in the measurement of the eccentricity amount based on the coordinates of the measurement point, and to determine whether or not the correction of the measurement point is necessary. How the measurement error can be detected by the use of the straight-line patterns 5 will be described below.

Figure 5:
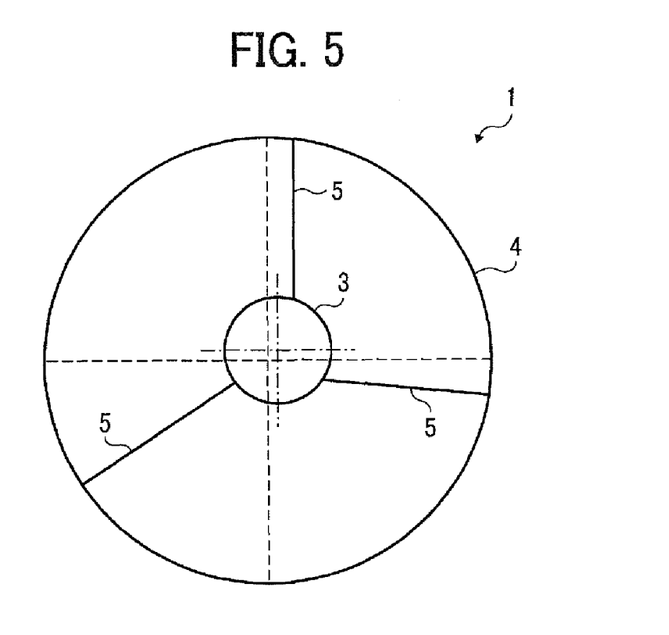
FIG. 5 is a simplified diagram of the rotary disk in FIG. 2, wherein a radial scale is removed.
Figure 6:
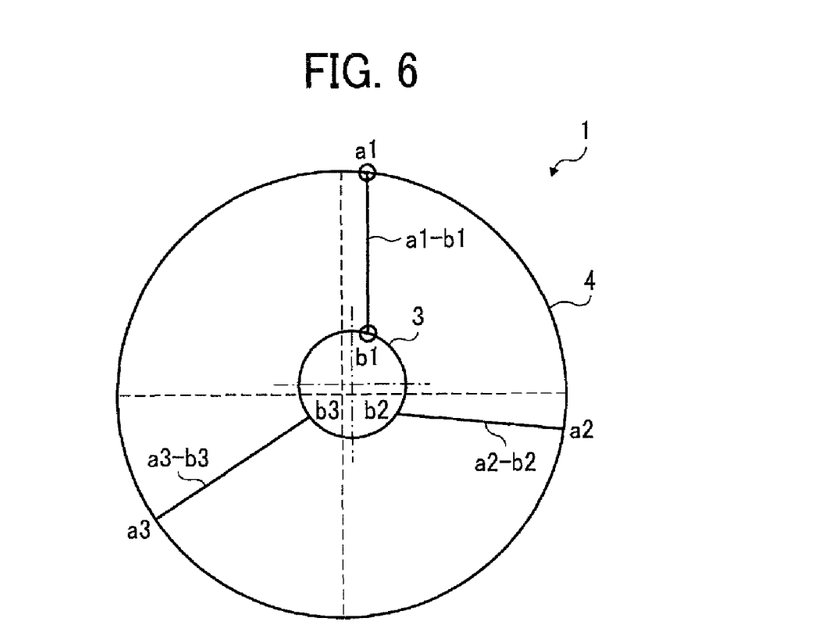
FIG. 6 is a first diagram illustrating a procedure of determining the presence or absence of a measurement error.
Figure 7:
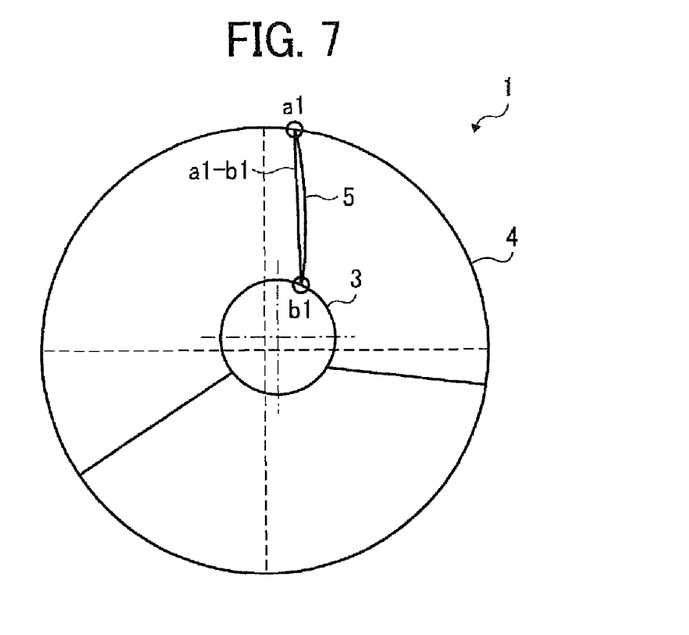
FIG. 7 is a second diagram illustrating a procedure of determining the presence or absence of a measurement error.
Figure 8:
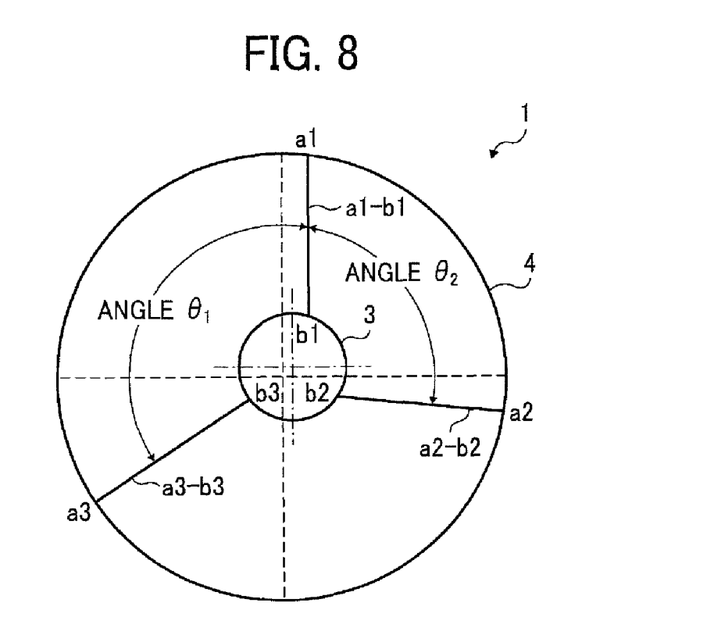
FIG. 8 is a third diagram illustrating a procedure of determining the presence or absence of a measurement error.

Referring now to FIG. 5, there is provided a simplified diagram of the rotary disk 1 in FIG. 2. In FIG. 5, the radial scale 2 is removed. Further, FIGS. 6 to 8 are diagrams illustrating a procedure of determining the presence or absence of a measurement error. The steps of the procedure of detecting the measurement error will be sequentially described below.

As illustrated in FIG. 6, intersections a1 to a3 of the straight-line patterns 5 formed on the rotary disk 1 and the concentric circle pattern 4 are first selected. Then, intersections b1 to b3 of the straight-line patterns 5 and the attachment hole 3 are selected. Each of the thus selected six points forms the measurement point described above.

Subsequently, as illustrated in FIG. 6, straight lines are drawn to connect the respective intersections a1 to a3 and the corresponding intersections b1 to b3 selected in the first step. That is, straight lines a1-b1, a2-b2, and a3-b3 connect the intersections a1 and b1, a2 and b2, and a3 and b3, respectively.

In this case, if a portion of the rotary disk 1 corresponding to the straight line a1-b1 is distorted or warped, for example, the straight-line pattern 5 in the portion is also distorted, as illustrated in FIG. 7. Therefore, when projected by a microscope or projector, the straight-line pattern 5 is projected as a curved line. As a result, a difference arises between the straight-line pattern 5 and the straight line a1-b1. A similar difference also arises when a portion of the rotary disk 1 corresponding to the straight line a2-b2 or a3-b3 is distorted.

As described above, if the rotary disk 1 is distorted, for example, accurate measurement of the eccentricity amount is prevented, even if the coordinates of the measurement points are accurately measured as described above. However, the difference between the straight line a1-b1, a2-b2, or a3-b3 and the corresponding straight-line pattern 5 can be visually observed easily with the use of a measuring microscope or projector. Therefore, a distortion of the rotary disk 1 and a setting error can be detected. Accordingly, it is possible to prevent the eccentricity amount from being measured in the distorted state of the rotary disk 1, and thus to prevent a measurement error.

Further, as illustrated in FIG. 8, if the respective angles of the three straight-line patterns 5 are known, it is possible to compare the respective angles of the three straight lines a1-b1, a2-b2, and a3-b3 obtained from the six selected points with the ideal angles of the straight-line patterns 5, and thus to know the presence or absence of a measurement error and the magnitude of the error on the basis of the difference between the compared angles.

As the number of the straight-line patterns 5 is increased, the measurement accuracy is improved. Naturally, however, the time taken for the measurement is also increased. Therefore, the number of straight-line patterns 5 should be determined in consideration of the balance between the accuracy and the time.

Figure 9:
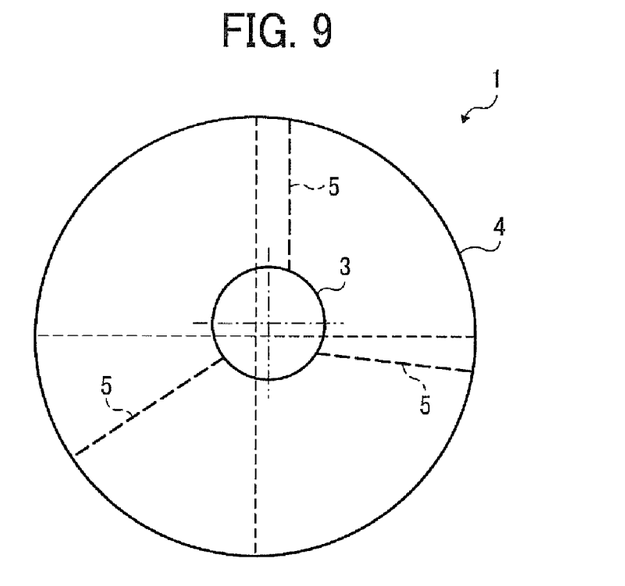
FIG. 9 is a diagram illustrating another example of the straight-line patterns.

FIG. 9 is a diagram illustrating another example of the straight-line patterns 5. As illustrated in FIG. 9, the straight-line patterns 5 are not necessarily limited to solid lines, but may be formed into broken lines. With the straight-line patterns 5 thus formed by the broken lines, any other patterns or marks do not intersect with the straight-line patterns 5. However, as long as the broken-lined straight-line patterns 5 intersect or contact with the concentric circle pattern 4 and the attachment hole 3, the effect of enabling the accurate measurement of the intersections is unaffected.

Second Embodiment

Figure 10:
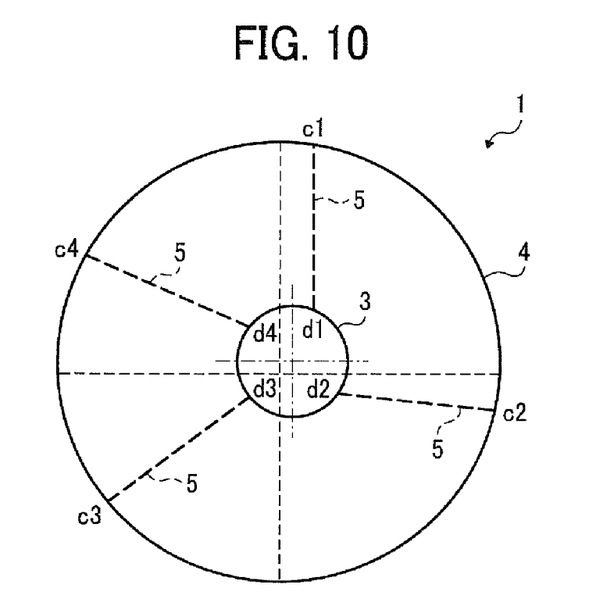
FIG. 10 is a diagram illustrating a rotary disk according to a second embodiment of the present invention.

With reference to FIG. 10, the rotary disk 1 of a rotary encoder according to a second embodiment of the present invention will be described. FIG. 10 is a diagram illustrating the rotary disk 1 according to the second embodiment.

As illustrated in FIG. 10, the number of the straight-line patterns 5 is set to be four in the present embodiment. As illustrated in FIG. 10, in the example including the four straight-line patterns 5, selection of intersections c1 to c4 of the four straight-line patterns 5 and the concentric circle pattern 4 is first performed, in addition to the procedure performed in the first embodiment.

Then, intersections d1 to d4 of the straight-line patterns 5 and the attachment hole 3 are selected. The intersections c1 and d1, c2 and d2, c3 and d3, and c4 and d4 are respectively two points on the same straight-line pattern 5.

Figure 11:
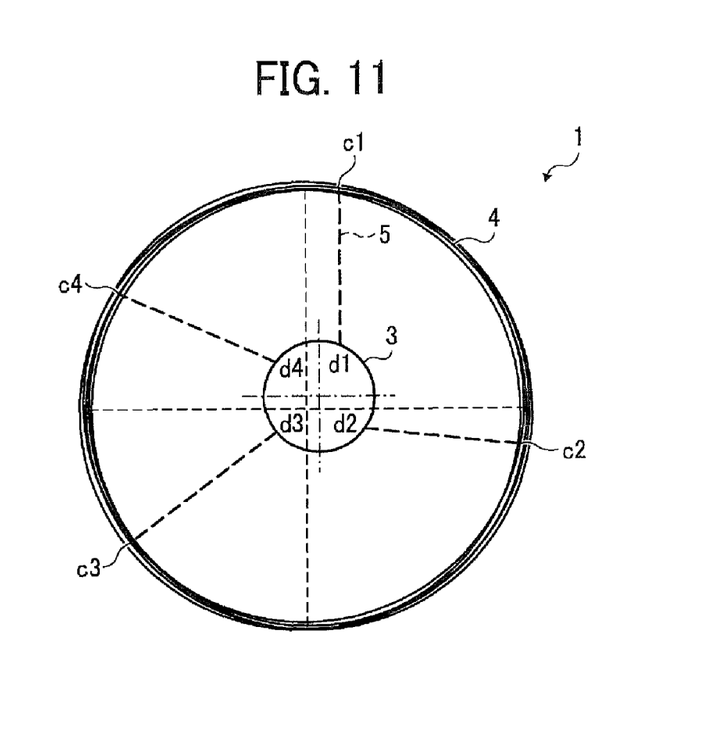
FIG. 11 is a diagram for explaining a procedure of determining a measurement error in the rotary disk according to the second embodiment.

FIG. 11 is a diagram for explaining a procedure of determining a measurement error in the rotary disk 1 of the present embodiment. As illustrated in FIG. 11, with the use of the four intersections c1 to c4, at which the concentric circle pattern 4 intersects with the straight-line patterns 5, four circles each passing through three of the four intersections c1 to c4 are drawn. That is, a circle passing through the intersections c1, c2, and c3, a circle passing through the intersections c1, c2, and c4, a circle passing through the intersections c1, c23 and c4, and a circle passing through the intersections c2, c3, and c4 are drawn.

On the basis of the difference among the four circles thus drawn or among the respective centers thereof, it is possible to know the presence or absence of a measurement error and the magnitude of the error. With the measurement of the coordinates of the intersections c1 to c4, the position (i.e., coordinates) of the center of each of the four drawn circles is calculated. If the coordinates of the four intersections c1 to c4 are all measured accurately, all of the calculated coordinates of the center points match.

If there is a measurement error in any of the four intersections c1 to c4, however, the calculated positions of the respective center points do not match. Therefore, with the comparison of the coordinates of the respective center points of the four circles, it is possible to determine the presence or absence of a measurement error and the magnitude of the error, and thus to detect a setting error of the measurement point.

Further, although not illustrated, four circles each passing through three of the four intersections d1 to d4, at which the attachment hole 3 intersects with the straight-line patterns 5, are drawn in a similar manner to the above example of the concentric circle pattern 4. That is, a circle passing through the intersections d1, d2, and d3, a circle passing through the intersections d1, d2, and d4, a circle passing through the intersections d1, d3, and d4, and a circle passing through the intersections d2, d3, and d4 are drawn. Then, on the basis of the difference among the circles or among the respective centers thereof, it is possible to know the presence or absence of a measurement error and the magnitude of the error, and thus to detect a setting error of the measurement point, similarly to the above example.

In the detection of an error based on the presence or absence of a difference between a straight line passing through two measurement points and the corresponding straight-line pattern 5, as in the first embodiment, a difference in the circumferential direction of the rotary disk 1 is easy to observe. However, a difference in the direction of the straight-line pattern 5 is relatively difficult to observe.

Meanwhile, in the present embodiment, the number of the straight-line patterns 5 is set to be four, and a measurement error is detected on the basis of the degree of coincidence (i.e., overlapping) or difference among the four circles drawn as described above or among the respective centers thereof. With this configuration, it is possible to detect the setting error of the measurement point, and also to improve the measurement accuracy.

As the number of the straight-line patterns 5 is increased, the measurement accuracy is improved. Naturally, however, the time taken for the measurement is also increased. Therefore, the number of the straight-line patterns 5 should be determined in consideration of the balance between the accuracy and the time.

Third Embodiment

Figure 12:
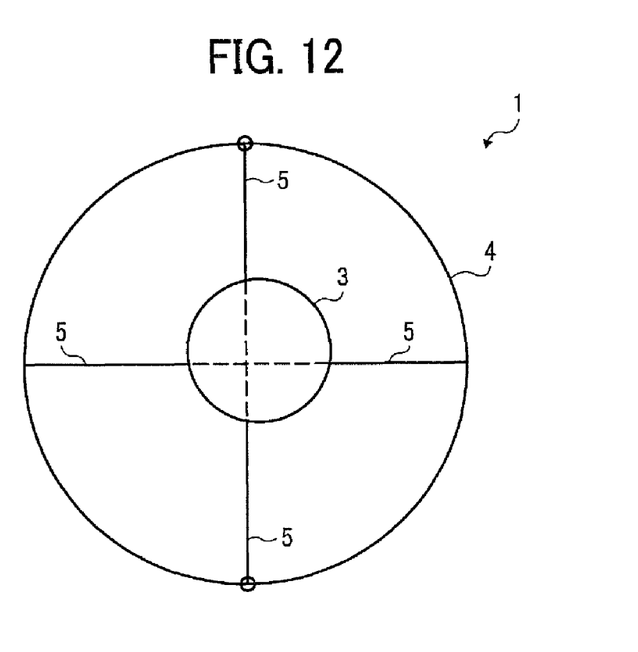
FIG. 12 is a diagram illustrating a rotary disk according to a third embodiment of the present invention.

With reference to FIG. 12, the rotary disk 1 of a rotary encoder according to a third embodiment of the present invention will be described. FIG. 12 is a diagram illustrating the rotary disk 1 according to the third embodiment. Also in the rotary disk 1 of the present embodiment, four straight-line patterns 5 are formed. As illustrated in FIG. 12, however, each two of the straight-line patterns 5 are configured to form a single straight line across the attachment hole 3.

Figure 13:
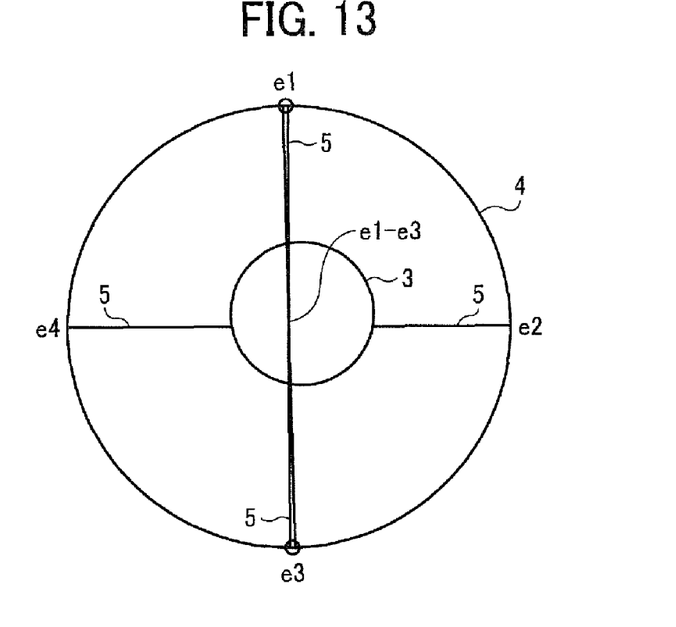
FIG. 13 is a first diagram for explaining a procedure of determining a measurement error in the rotary disk according to the third embodiment.

Then, as illustrated in FIG. 13, two intersections e1 and e3, at which the concentric circle pattern 4 intersects with a pair of the straight-line patterns 5 forming the single straight line, are selected, and a straight line e1-e3 is drawn.

With this configuration, a difference between the thus drawn straight line e1-e3 and the corresponding straight-line patterns 5 can be visually observed easily. Therefore, it is possible to appropriately determine whether or not the reselection of the measurement point is necessary.

Figure 14:
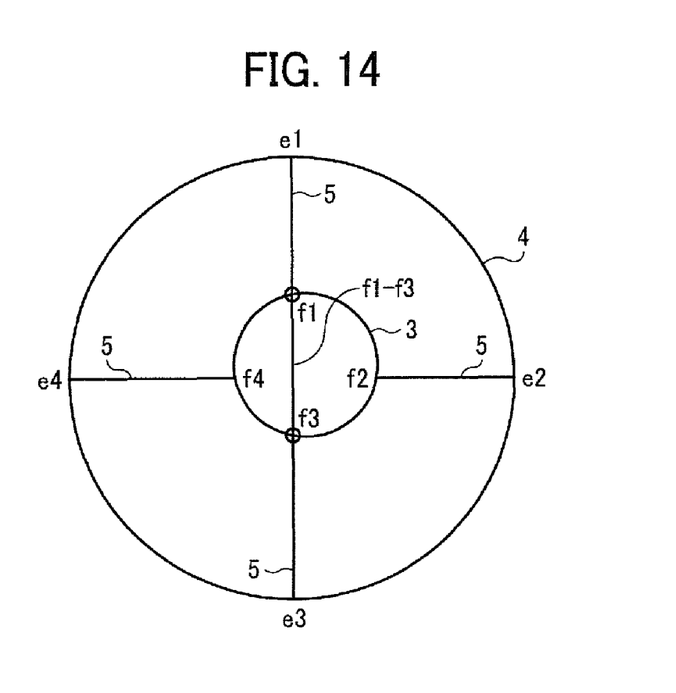
FIG. 14 is a second diagram for explaining a procedure of determining a measurement error in the rotary disk according to the third embodiment.
Figure 15:
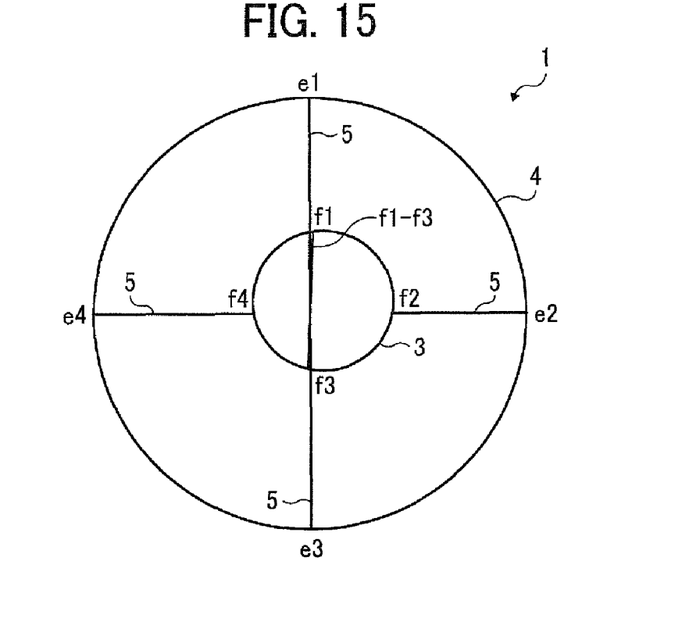
FIG. 15 is a third diagram for explaining a procedure of determining a measurement error in the rotary disk according to the third embodiment.

Then, as illustrated in FIG. 14, in the state in which the straight line e1-e3 is drawn, intersections f1 and f3, at which the attachment hole 3 intersects with the straight-line patterns 5, are connected by a straight line. That is, a straight line f1-f3 is drawn. As illustrated in FIG. 15, a difference between the straight line f1-f3 and the straight-line patterns 5 can be easily observed.

The difference in angle between the straight line e1-e3 of FIG. 13 and the corresponding straight-line patterns 5 and a difference in angle between the straight line f1-f3 of FIGS. 14 and 15 and the corresponding straight-line patterns 5 can be easily observed. Therefore, it is possible to appropriately determine whether or not the reselection of the measurement point is necessary. If the above-described method is combined with the respective procedures of the first and second embodiments, further improvement in accuracy can be achieved.

Further, if the straight-line patterns 5 configured to form one straight line are formed with a predetermined angle, and if the angle formed by the straight-line patterns 5 is known, a measurement error can be detected from the difference between the ideal angle and the actually measured value. That is, with the comparison between the angle formed by the straight lines connecting the measurement points and the angle formed by the straight-line patterns 5, whether or not it is necessary to correct the measurement points can be detected.

As the number of the straight-line patterns 5 is increased, the measurement accuracy is improved. Naturally, however, the time taken for the measurement is also increased. Therefore, the number of the straight-line patterns 5 should be determined in consideration of the balance between the accuracy and the time.

The procedure of determining whether or not it is necessary to correct the measurement point has been described above. With one of the straight-line patterns 5 used as a reference, the direction of the difference between the center of the radial scale 2 and the center of the attachment hole 3 is also detected.

Figure 16:
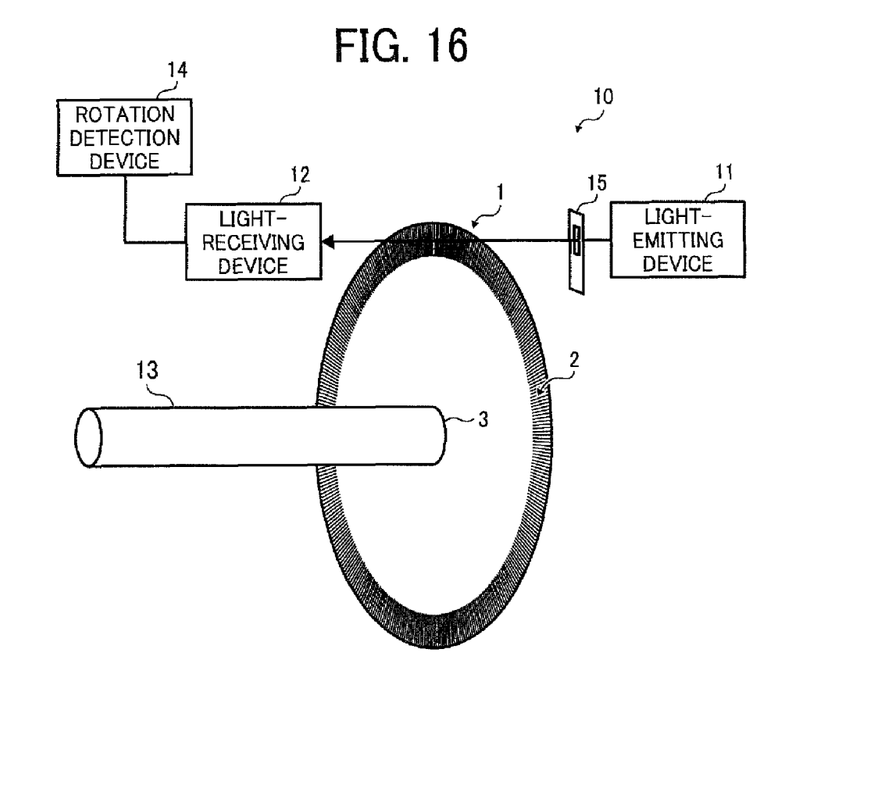
FIG. 16 is a diagram illustrating the configuration of a rotary encoder including a rotary disk according to an illustrative embodiment of the present invention.

FIG. 16 is a diagram illustrating the configuration of a rotary encoder including a rotary disk according to an illustrative embodiment of the present invention. A rotary encoder 10 includes the rotary disk 1, a light-emitting device 11, a light-receiving device 12, a rotation detection device 14, and a slit 15. The rotary disk 1 includes the radial scale 2 including the light-transmitting portions 2a and the light-blocking portions 2b. The light-emitting device 11 projects light to the radial scale 2 through the slit 15. The light-receiving device 12 receives light transmitted through the light-transmitting portions 2a of the radial scale 2. The rotation detection device 14 detects the rotational state of the rotary disk 1 on the basis of the information of whether or not the light-receiving device 12 has received the light. Further, a rotary shaft 13 of a measured object (i.e., rotary member) such as a roller is connected to the rotary encoder 10 through the attachment hole 3 provided to the rotary disk 1.

Alternatively, the rotary disk 1 may be configured to include light-reflecting portions for reflecting the light from the light-emitting device 11 and light-absorbing portions for absorbing the light, in place of the light-transmitting portions 2a and the light-blocking portions 2b of the radial scale 2, such that the light-receiving device 12 detects light reflected by the light-reflecting portions. In this case, the light-receiving device 12 is provided on the same side as the light-emitting device 11 with respect to the rotary disk 1, unlike the example illustrated in FIG. 16.

Figure 17:
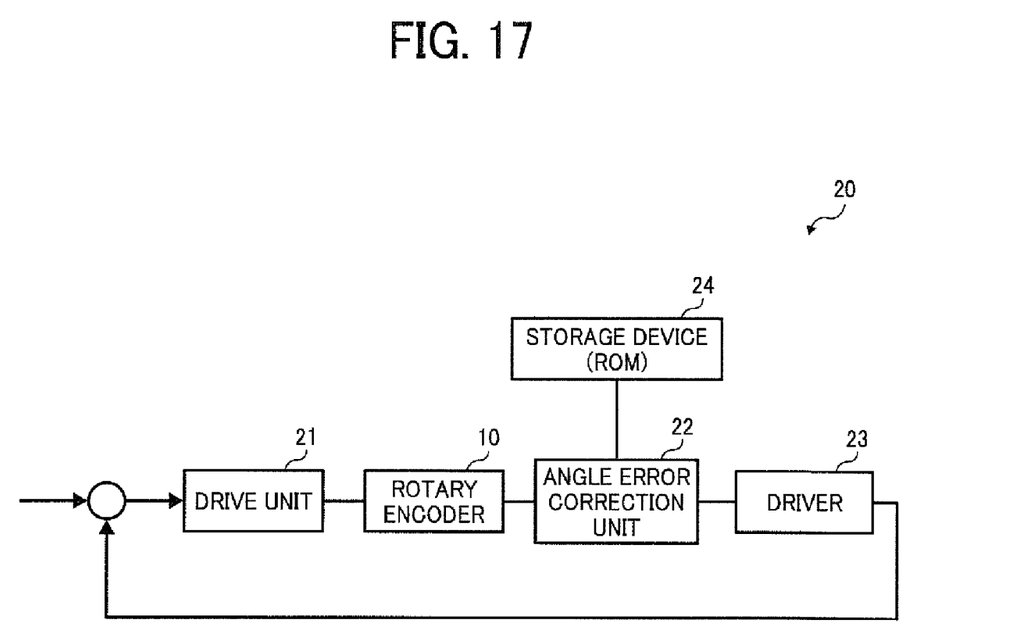
FIG. 17 is a diagram illustrating a rotary member control device including a rotary encoder according to an illustrative embodiment of the present invention.

FIG. 17 is a diagram illustrating a rotary member control device including a rotary encoder according to an illustrative embodiment of the present invention. A rotary member control device 20 includes a drive unit 21, the rotary encoder 10 according to an illustrative embodiment of the present invention, an angle error correction unit 22, a driver 23, and a storage device 24. The drive unit 21 includes an electrically connected motor and so forth. The storage device 24 is a ROM (Read-Only Memory) for storing the measured difference direction and difference amount (i.e., eccentricity amount) between the center of the attachment hole 3 and the center of the rotary disk 1 of the rotary encoder 10.

In accordance with the difference direction and the difference amount, the angle error correction unit 22 corrects an angle detection error in the information relating to the rotational state of the rotary disk 1 output from the rotary encoder 10. The driver 23 generates a drive signal for operating the driver unit 21 in accordance with the corrected rotational state information.

With the input of the difference direction and the difference amount between the center of the rotary disk 1 in the rotary encoder 10 and the center of the attachment hole 3 attached to the drive shaft of the rotated member, the angle error correction unit 22 detects the timing and frequency of the angle detection error of the rotary encoder 10.

Therefore, if a feed-forward control for correcting the angle error of the rotary encoder 10 is performed by the rotary member control device 20 including the rotary encoder 10, a rotary member control unaffected by the above-described difference can be performed.

The above-described embodiments are illustrative and do not limit the present invention. Thus, numerous additional modifications and variations are possible in light of the above teachings.

For example, elements at least one of features of different illustrative and exemplary embodiments herein may be combined with each other at least one of substituted for each other within the scope of this disclosure and appended claims.

Further, features of components of the embodiments, such as the number, the position, and the shape, are not limited the embodiments and thus may be preferably set. It is therefore to be understood that within the scope of the appended claims, the disclosure of this patent specification may be practiced otherwise than as specifically described herein.

What is claimed is:

1. An eccentricity measurement method of measuring the eccentricity between a center of a connection portion of a rotary disk of a rotary encoder connected to a rotary shaft of a rotary member and a center of a scale formed at the peripheral portion of the rotary disk, the eccentricity measurement method comprising:

forming, on the rotary disk, a circle pattern concentric with the scale and at least three straight-line patterns intersecting or contacting the circle pattern and the connection portion; and measuring an amount and direction of eccentricity of the rotary disk by comparing a coordinate of the center of the connection portion, which is calculated from coordinates of intersections of the straight-line patterns and the connection portion, with a coordinate of the center of the scale, which is calculated from the coordinates of intersections of the straight-line patterns and the circle pattern, wherein a central portion of the rotary disk includes the connection portion and the scale including one of a combination of a light-transmitting portion and a light-blocking portion or a combination of a light-reflecting portion and a light-absorbing portion.

2. The eccentricity measurement method according to claim 1, further comprising:

determining an error in the measurement in accordance with the difference between each of the straight-line patterns and a straight line connecting the intersection of the straight-line pattern and the circle pattern and the intersection of the straight-line pattern and the connection portion.

3. The eccentricity measurement method according to claim 1, further comprising:

determining an error in the measurement in accordance with the difference between an angle formed by two of the straight-line patterns and an angle formed by a straight line connecting the intersection of one of the two straight-line patterns and the circle pattern and the intersection of the one of the two straight-line patterns and the connection portion and a straight line connecting the intersection of the other straight-line pattern and the circle pattern and the intersection of the other straight-line pattern and the connection portion.

4. The eccentricity measurement method according to claim 1, wherein four straight-line patterns are formed on the rotary disk.

5. The eccentricity measurement method according to claim 4, further comprising:
determining an error in the measurement in accordance with the difference among circumferences or centers of circles each connecting three of four intersections of the straight-line patterns and the circle pattern.

6. The eccentricity measurement method according to claim 4, further comprising:
determining an error in the measurement in accordance with the difference among the circumferences or centers of circles each connecting three of four intersections of the straight-line patterns and the connection portion.

7. The eccentricity measurement method according to claim 4, wherein the four straight-line patterns comprise two pairs of straight-line patterns, and each pair forms a single straight line across the connection portion.

8. The eccentricity measurement method according to claim 7, further comprising:
determining an error in the measurement in accordance with the difference between a straight line connecting two intersections of the circle pattern and the single straight line, and the single straight line.

9. The eccentricity measurement method according to claim 1, wherein each of the straight-line patterns is a broken line.

10. A rotary encoder comprising:
a rotary disk, an eccentricity amount and direction of which are measured by an eccentricity measurement method of claim 1;
a light projection device to irradiate light onto the rotary disk;
a light detection device to detect light transmitted through or reflected by a scale provided to the rotary disk; and
a rotation detection device to detect the rotational state of the rotary disk in accordance with a result of the detection provided by the light detection device.

11. A rotary member control device for controlling the rotation of a rotary member, the rotary member control device comprising:
a rotary encoder of claim 10 attached to the rotary shaft of the rotary member, to detect the rotational state of the rotary disk;
a storage device to store the eccentricity amount and direction of the rotary disk; and
an error correction device to correct the rotational state in accordance with the eccentricity amount and direction such that the corrected rotational state is used to control the rotation of the rotary member.

* * * * *